United States Patent [19]

Holroyd et al.

[11] 4,399,187
[45] Aug. 16, 1983

[54] REINFORCED ARTICLES

[75] Inventors: Eric Holroyd, Knutsford; David J. B. Perkins, Liverpool, both of England

[73] Assignee: W & A Bates Limited, London, England

[21] Appl. No.: 283,039

[22] Filed: Jul. 13, 1981

[30] Foreign Application Priority Data

Jul. 26, 1980 [GB] United Kingdom ............... 8024545

[51] Int. Cl.³ .............................................. B60C 9/20
[52] U.S. Cl. .................................. 428/295; 152/359; 152/361 R; 152/361 FP; 152/361 DM; 156/117
[58] Field of Search ............... 156/117; 152/357–359, 152/361 R, 316 FP, 361 DM; 428/232, 294, 295

[56] References Cited

U.S. PATENT DOCUMENTS

| 1,250,917 | 12/1917 | McLeod | 156/117 |
| 1,317,664 | 9/1919 | Nall | 156/117 |
| 2,493,614 | 1/1950 | Bourdon | 152/356 |
| 3,310,093 | 3/1967 | Frazier | 152/361 R |
| 3,770,042 | 11/1973 | Greene et al. | 152/361 R |
| 3,881,538 | 5/1975 | Mirtain | 152/361 FP |
| 3,949,799 | 4/1976 | Montagne | 152/361 FP |
| 4,237,953 | 12/1980 | Mathevet | 152/361 FP |

FOREIGN PATENT DOCUMENTS 89061 4/1972 German Democratic Rep. .

Primary Examiner—Caleb Weston
Assistant Examiner—Lois E. Boland
Attorney, Agent, or Firm—Stevens, Davis, Miller & Mosher

[57] ABSTRACT

Tire breaker fabric for a pneumatic tire comprising a sheet of tire cords wherein the cords comprise a twisted package of high modulus material filaments having a twist angle of not more than 18° and the cords are formed by one single continuous cord which extends back and forth across the sheet in a zig-zag formation. The cords are preferably closely spaced and held in the sheet by a thin sheet of elastomeric material. The invention provides in addition a tire including breaker fabric of this type.

17 Claims, 5 Drawing Figures

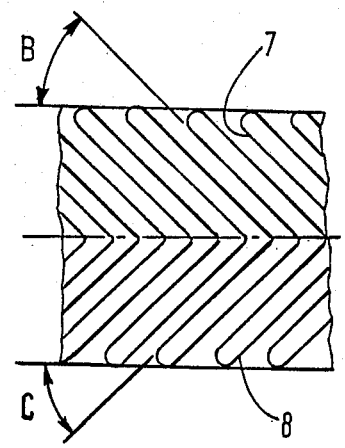
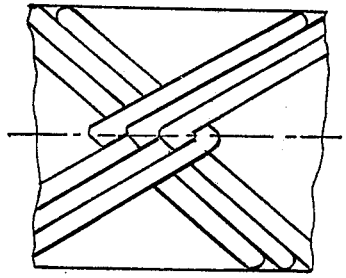
FIG. 3   FIG. 4
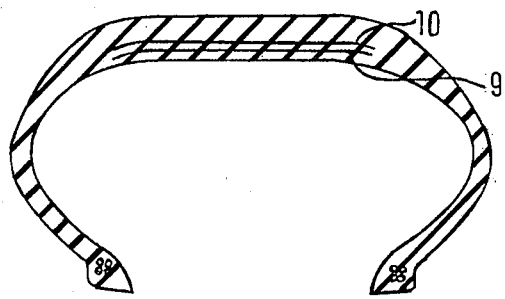
FIG. 5

REINFORCED ARTICLES

This invention relates to reinforced articles and in particular to tires and the construction of tire tread reinforcements or breakers and the materials for said breakers.

Tire breakers comprise one or more layers of plies of adjacent parallel cords extending across the width of the tread usually with the cords at an acute angle to the circumferentially extending center-line of the tread. The edges of the breaker plies are formed by the adjacent cut ends of the cords and these cut edges are often the source of weaknesses in tires which lead to failure. The weaknesses are due to the failure of the bond between the cords and the remainder of the tire initiated by the cut ends of the cord filaments.

One common breaker construction which has been developed to avoid the above problem is to fold the edges of the breaker plies axially inwards so that the edges of the breaker assembly are formed by the folds but such assemblies are expensive, place other restrictions on the breaker design and manufacture, and modify the performance of the tire.

Another construction utilizing thin steel monofilaments was described in East German Pat. No. 89061 of 1971. The patent was intended to overcome a problem at the cross over points between adjacent breaker plies and this problem was said to be solved by using thin monofilaments. The breaker ply described comprised a continuous thin monofilament of steel having a diameter at most of a few tenths of a millimeter which zig-zagged back and forth across the ply so as to provide in each successive traverse the next adjacent monofilamentary reinforcement of the ply. The construction, however, was never exploited and would in practice be unable to provide sufficient fabric strength due to the size of the monofilaments which diameter is itself severely limited because of the bend radius at the ply edges. Such filaments are unable to resist compressive stresses and buckle leading to rapid cord fatigue and would in practice be unsatisfactory because as experiments have shown, thin monofilaments cannot survive compression in rubber without buckling and rapid fatigue. Furthermore thick monofilaments would be so highly stressed by bending into a loop at the edges which would result in fatigue failure that they could not be used.

It is an object of the present invention to provide an alternative practicable breaker ply construction having the necessary physical properties and in which some of the above difficulties are avoided.

According to one aspect of the present invention tire breaker fabric comprises an elongate sheet of tire cord fabric having edges spaced apart by the width of the breaker for which said fabric is intended wherein the tire cords comprise a twisted package of high modulus material filaments having a twist angle as defined herein of not more than 18° and the cords extending across the sheet are formed by one single continuous tire cord which extends back and forth across the sheet being folded at each edge on itself about an axis perpendicular to the plane of the sheet so that the edges of the sheet are formed by a series of folded cord edges.

By high modulus material is meant material having a modulus of 5000–21,000 Kg/mm², for example steel, glass fibre or aromatic polyamide (e.g. Kevlar—Registered Trade Mark).

In this specification the twist angle of a cord is defined by $$\tan(\text{angle of twist}) = \frac{\pi \times \text{cord diameter (mm)}}{2 \times \text{lay length (mm)}}$$

The cords are preferably laid substantially at such a pitch that the separation between cords is less than 1.2× the cord diameter and greater than 0.2× the cord diameter and retained in relative position in the sheet of fabric by means of a sheet of elastomer for example rubber coating compound applied to one side of the assembled cords, for example by frictioning or pressing. Two sheets of elastomer may be applied to the sheet one on either side.

The filaments or cords may be precoated or pretreated in any of the conventional ways including precoating with elastomeric material. The cords may be constructed of closely packed filaments or they may be of the open filament type.

The cords may extend at 90° to the longitudinal center-line of the breaker fabric but may also be at the more usual acute angle to the center-line (for example 21°). The cords are preferably straight throughout each traverse of the sheet or may be laid in a chevron pattern in which each traverse of the cord is "V"-shaped with the point of the "V" substantially at the longitudinal center-line of the sheet. This chevron type of fabric produces a single ply balanced breaker fabric. Alternatively a chevron type of fabric may be formed by two cords which are separately laid to each form one half of the width of the sheet. Conveniently the two cords may be interlaced at the center of the sheet although this is not essential.

Another aspect of the invention provides a breaker ply hoop for a tire comprising a strip of breaker fabric as above joined end-to-end to form said ply hoop.

The end-to-end join is preferably by a butt joint along the angle of the cords between the two ends of a sheet cut to the required length.

Another aspect of the invention provides a breaker package for a tire comprising two or more plies of tire breaker fabric at least one of which is formed from ply breaker fabric as above.

Yet another aspect of the invention provides a radial ply tire wherein the tire tread is reinforced by a layer of ply breaker fabric as above.

Further aspects of the invention will be apparent from the following description, by way of example only, of some embodiments of the invention in conjunction with the attached diagrammatic drawings in which:

FIG. 3 is a plan view of a chevron fabric construction;

FIG. 4 is a plan view of one alternative chevron fabric construction;

FIG. 5 is a cross-section of part of a tyre incorporating a breaker package according to the present invention.

Figure 1:
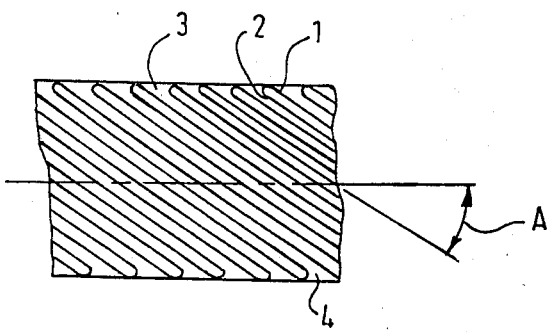
FIG. 1 is a plan view of a short length of breaker fabric according to the present invention.
Figure 2:
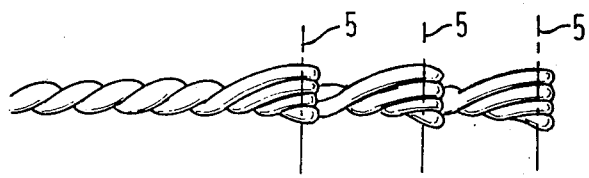
FIG. 2 is a side view of part of the fabric of FIG. 1.

The breaker fabric shown in FIGS. 1 and 2 is an elongated sheet of fabric having parallel, closely-spaced steel wire reinforcement cords 1 and 2 laid at an acute angle A of 21° to the longitudinal center-line of the elongated sheet. The cord comprises 1×4/0.25 mm diameter brass plated steel filaments twisted with a twist angle of 7.4°. It should be noted that the parallel cord assembly comprises a continuous single cord laid in zig-zag fashion such that the cords marked 1 when they reach the edge 3 of the sheet fold back on themselves and follow the cord path marked 2. At the other side 4 of the sheet the cords 2 fold back again along the next path 1. Thus the single cord is laid in a zig-zag configuration with successive traverses adjacent to one another. The spacing or gap between adjacent cords is 0.25× the cord diameter. The cord folds form a looped edge construction.

FIG. 2 shows the axis 5 of the fold between adjacent cords to be perpendicular to the main surface areas of the sheet and the filaments of the cord to have been re-arranged in a vertical line around the loop so that each filament is approximately under similar conditions of bend radius and loading. The cords are held in the assembled positions by means of unvulcanised rubber compound 6 which is pressed into the cord assembly by means of a pair of rollers in the same manner as conventional tyre cord fabric.

The resultant tire cord fabric sheet is thus close to the required width for use in tire building, the cords are already close to the required bias angle, no cut cord ends exist at the fabric edges and yet the fabric sheet has a substantially uniform thickness which provides further freedom in tire design and building methods.

Furthermore, the multifilament cord of relatively low twist angle provides a construction in which the filaments support each other against buckling in the tire under service conditions but during bending of the loops at the fabric edges during manufacture the filaments move so as to approach a sheet formation which allows bending without generating high surface stresses which would lead to fatigue failure in use.

The breaker fabric shown in FIG. 3 is again formed by a single tire reinforcement cord laid so as to repeatedly traverse the width of the longitudinally extending sheet but in this case each traversing cord is laid in a "V" formation such that one traversing cord has a bias angle B of 21° to one side of the longitudinal center-line for one half 7 of the strip and a bias angle C of −21° for the other half 8 of the strip.

The resultant single ply of breaker material has a so-called balanced construction in that a tire breaker made from even a single ply of such a fabric would provide a tire of balanced construction.

The variation shown in FIG. 4 utilises two separate tire cords each of which is laid in a similar zig-zag fashion to FIG. 2 completely across the fabric. In this case, however, a two-cord thick fabric is formed and the two plies of cords are interlocked at the center. This is done by laying the "V" of one cord with its point in the other direction to that of the other cord and looping one cord around the other at the center.

Various other arrangements are possible to provide multiple breaker fabrics with or without interlocking and different fabric widths and strengths can be provided by using different widths of lay and different cords. Furthermore various cord angles to the circumferential direction may be used including 90° for one or more plies according to the breaker requirements of the tyre being made.

The fabric may also be formed with a preformed crown curvature, i.e. with a curvature across its width. Furthermore, the fabric may be laid in a continuous sheet and cut off to the required lengths for tire building or may be formed in a continuous hoop of the required diameter for the tire to be made.

The tire shown in FIG. 5 is a 155SR13 radial ply tire intended for a passenger car. The tread width is 110 mm and the breaker package or assembly comprise two plies 9 and 10 of tire cord fabric each according to the present invention. The radially inner ply 9 has a width of 118 mm and the radially outer ply 10 has a width of 108 mm. Each ply comprises a fabric of zig-zag configuration of 1×4/0.25 mm steel cord (i.e. 0.25 mm filament diameter and 4 filaments per cord). The twist angle of the cord is 7.4°, the lay length being 8.5 mm. The breaker plies are joined by butt joins in the conventional way. The remainder of the tire construction is of a conventional radial ply type.

The tire described was tested on a typical test machine to show breaker edge failures. The test comprised running the tire at design inflation pressure and at 50% overload above its design load. The speed was 50 km per hour and the tire and wheel were cycled through ±4° slip angle 20 times in a three minute period followed by 3 minutes running straight. This schedule was repeated until breaker edge looseness was suspected whereupon the tire was cut for examination.

Normal 155SR13 tires having a two ply steel cut edge breaker of the same rating were found to have suffered major looseness of the cords at the breaker edges at 2–3 days of this test whereas the tire of the present invention was found to have suffered only slight edge looseness after a full 13 days on the above test.

The construction is considered to be of such advantage in all radial ply tires having a steel tread reinforcing breaker structure including car and truck tires. Furthermore the provision of single breaker plies of substantially constant properties across the full ply width without cut edges provides greater freedom of tire design as the inherent stiff zones of known folded edge plies are not found in the breaker fabric of the invention.

Having now described our invention what we claim is:

1. A tire breaker fabric for a pneumatic tire comprising an elongate sheet of tire cord fabric having edges spaced apart by a width of a breaker for which said fabric is intended wherein the tire cords are formed by one single continuous tire cord of twisted filaments of a material having a modulus of 5000–21,000 Kg/mm², the filaments of the cord having an angle of twist of not more than 18° where a tangent of the angle of twist is given by the formula $$\tan(\text{angle of twist}) = \frac{\pi \times \text{cord diameter (mm)}}{2 \times \text{lay length (mm)}}$$

the cord being folded back on itself at folded edges about an axis perpendicular to the plane of the sheet with the filaments of the cord arranged at said folded edges in a vertical line parallel to said axis so that the filaments each have substantially the same bend radius.

2. A tire breaker fabric according to claim 1, wherein adjacent cords are spaced apart by between 0.2 and 1.2 times the cord diameter.

3. A tire breaker fabric according to claim 1 wherein the cords are retained in relative position in the sheet of fabric by means of a thin sheet of elastomeric material pressed onto one side of the assembled cords.

4. A tire breaker fabric according to claim 1 wherein the cords extend across the sheet at an angle of 90° to a longitudinal center-line of the fabric.

5. A tire breaker fabric according to claim 1 wherein the cords extend across the sheet at an angle to a longitudinal center-line of the fabric.

6. A tire breaker fabric according to claim 1 wherein the cords are laid in a chevron pattern in which each traverse of the cord is "V"-shaped with a point of the "V" substantially at a longitudinal center-line of the sheet.

7. A tire breaker fabric according to claim 1 wherein the fabric is formed by two continuous cords which are separately laid to each form one half of the width of the sheet.

8. A tire breaker fabric according to claim 7 wherein the two continuous cords are interlaced at the center of the fabric sheet.

9. A tire breaker fabric according to claim 1 wherein the tire cords comprise a single twisted package of filaments in the form of a single strand.

10. A tire breaker fabric according to claim 1 wherein the tire cords comprise more than one strand each comprising a twisted package of filaments.

11. A tire breaker fabric according to claim 1 wherein the high modulus material is steel.

12. A tire breaker fabric according to claim 1 wherein the high modulus material is aromatic polyamide.

13. A tire breaker fabric according to claim 1 wherein the high modulus material is glass.

14. A tire breaker fabric according to claim 1 wherein said breaker fabric is formed as a strip which is joined end-to-end to form a breaker ply hoop.

15. A tire breaker fabric according to claim 14 wherein the join comprises a butt join along the angle of the cords between the two ends of the sheet forming the hoop.

16. A breaker package for a tire which comprises two or more plies of tire breaker fabric at least one of which is formed from ply breaker fabric according to claim 1.

17. A radial ply tire wherein the tire tread is reinforced by a layer of ply breaker fabric according to claim 1.

* * * * *